P. DAMM.
LOCK FOR VEHICLES.
APPLICATION FILED SEPT. 17, 1915.

1,206,818.

Patented Dec. 5, 1916.
3 SHEETS—SHEET 1.

Witnesses:
Chas. E. Whiteman

Inventor:
Peter Damm,
By his Attorney A. B. Mattingly

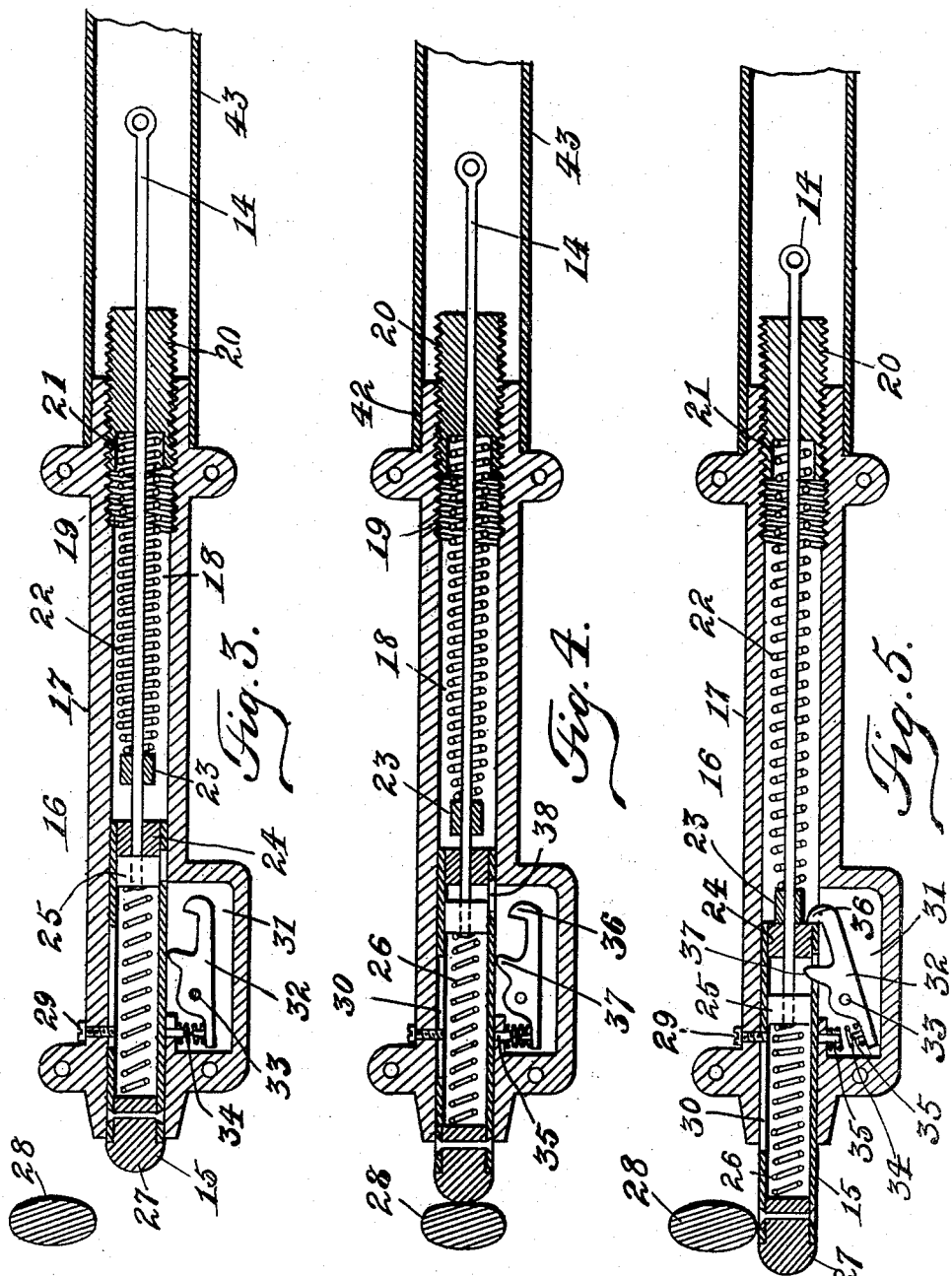

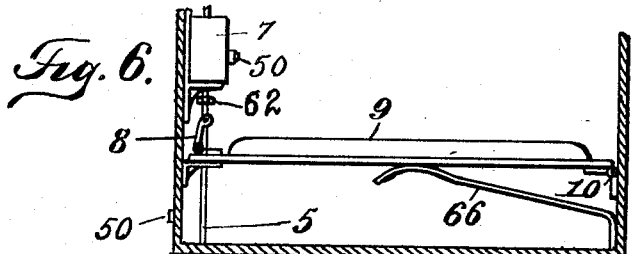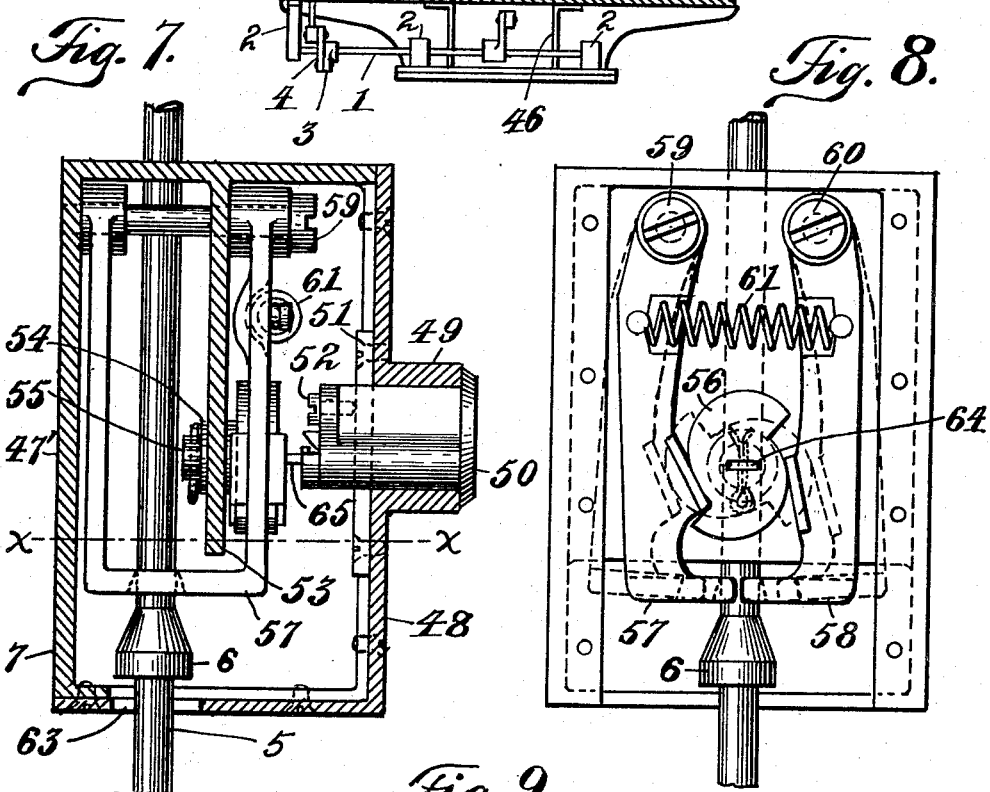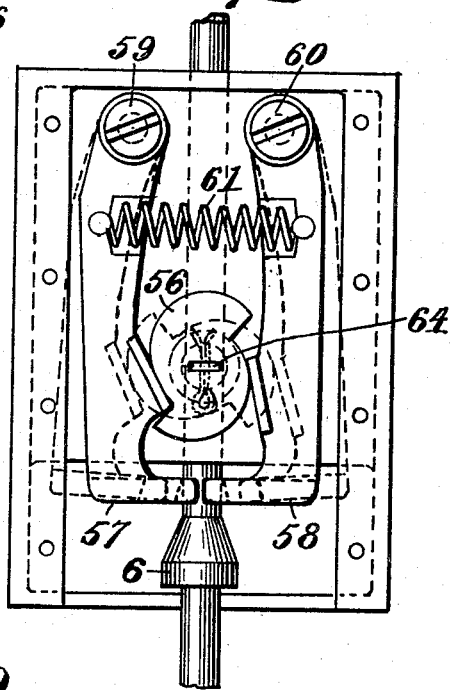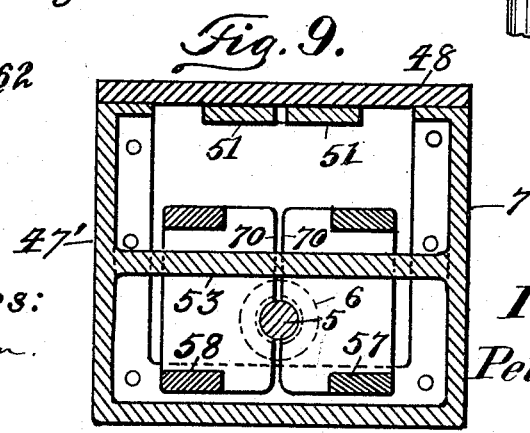

UNITED STATES PATENT OFFICE.

PETER DAMM, OF NEW YORK, N. Y., ASSIGNOR OF ONE-THIRD TO SELMAN LISS, OF NEW YORK, N. Y., AND ONE-THIRD TO LEOPOLD TROPP AND ONE-THIRD TO MORRIS M. TURITZ, BOTH OF BROOKLYN, NEW YORK.

LOCK FOR VEHICLES.

1,206,818.  Specification of Letters Patent.  Patented Dec. 5, 1916.

Application filed September 17, 1915. Serial No. 51,205.

*To all whom it may concern:*

Be it known that I, PETER DAMM, a citizen of the United States, and resident of New York, in the county of New York and State of New York, have invented certain new and useful Improvements in Locks for Vehicles, of which the following is a specification.

This present invention relates to improvements in automatic locks for vehicles, and more particularly to positive locks for vehicles, and is adaptable to all styles of wagons, carts and so forth.

The objects of this invention are to provide a simple and inexpensive means for automatically locking a vehicle to prevent the theft thereof, and also to automatically lock the vehicle in case of a run-away.

The further object is to provide a lock of this kind which will prevent the rear wheels of the vehicle from revolving and cause them to drag upon the road bed and thus prevent the vehicle from being easily and quickly transferred from one locality to another, and if a theft is being perpetrated the culprit can be easily overtaken and located by the tracks made by the dragging wheels, and the locked wheel of the vehicle will also indicate, if the vehicle is in motion, that a theft is being committed.

The still further object is to provide a lock of this character which cannot be released by any one except he is provided with the proper key, and to prevent dishonest drivers, after leaving the employment of a firm, from using a duplicate key which they may have made while in charge of the vehicle.

The still further objects will appear from a detailed description of the invention, which consists in the features of construction and combination of parts hereinafter described and claimed, and shown in the illustrations, of which—

Figure 1:
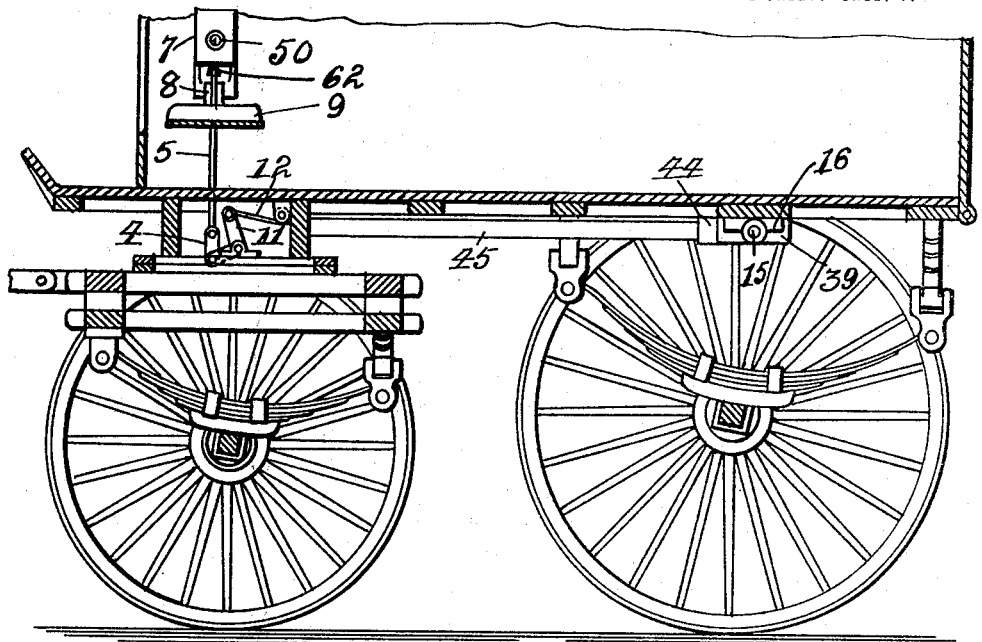
Figure 2:
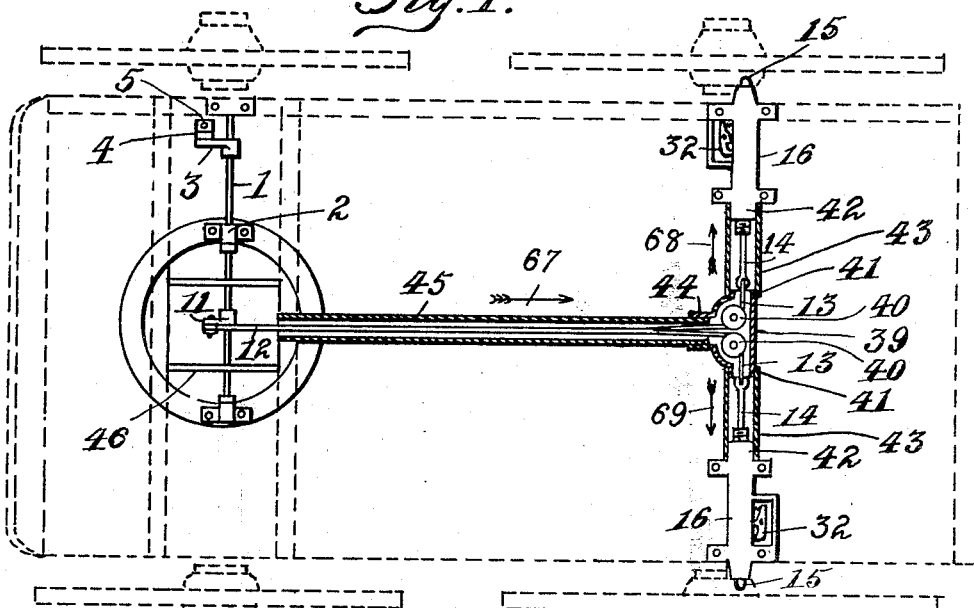

Figure 1 is a side elevation of a wagon, partly broken away to more clearly show the invention; Fig. 2 is a plan view of my invention, partly in section and showing a portion of an outline of the wagon by dotted lines; Fig. 3 is a sectional view of one of the locking members in its unlocked position; Fig. 4 is a similar view to Fig. 3, but showing the positions the parts assume if a spoke of the wheel is struck and the plunger is prevented from passing between the spokes of the wheel; Fig. 5 is a similar view to Fig. 3, but showing the locking member in its locked position; Fig. 6 is a transverse sectional view of a portion of the wagon, showing one method of applying my invention; Fig. 7 is a side elevation of the casing containing the locking mechanism and the lock, the casing being partly broken away; Fig. 8 is a front elevation of the casing having the front plate with the lock removed and showing the locking mechanism; and Fig. 9 is a horizontal section of the casing containing the locking mechanism, taken on the line x—x of Fig. 7.

While I have shown only one construction of my device, it will be understood that many changes and modifications and mechanical equivalents may be substituted for the various parts to suit different conditions, without departing from the spirit of my invention, and it is not thought necessary to illustrate the modifications, as they are obvious to those skilled in the art.

By referring to Figs. 1, 2 and 6, it will be seen that I have provided a rock shaft 1 having bearings 2 in the form of brackets, which may be secured to the vehicle in any suitable manner. Located on the rock shaft 1 is a rocking arm 3, with a link 4 connecting it to a plunger 5 carrying a conical locking member 6 and passing through a specially designed lock casing 7, and is connected by a bifurcated link 8 in the form of a hinge with the driver's seat 9, which is hinged at 10. The functions and further details of the lock will be fully described later on.

The rock shaft 1 is further provided with an arm 11 to which is secured a cable 12 having branch cables 13, which are connected to the links or operating rods 14 of the plungers 15 of the locking members 16, which are composed of several parts which are clearly shown in Figs. 3 to 5 and are contained in a casing 17, which may be secured to the vehicle in any suitable manner, but preferably by bolts.

The casing 17 is provided with a cylindrical bore 18, one end of which is provided with a thread 19 for the reception of a screw plug 20 having a counter-bore 21 in the end for the reception of the operating spring 22 of the rod 14, which passes through the plug 20. The spring 22 operates against the plug 20 and the collar 23 secured on the rod 14 which passes into the hollow plunger 15 through its bushing 24 secured in its rear end. Within the plunger 15, and secured to the end of the rod 14, is a collar or disk 25, which acts against a spring 26, which in turn acts against the plug 27 secured in the end of the plunger 15, which operates between the spokes 28 of the wagon wheels to lock them from turning.

Located in the casing 17 is a screw 29, which has its end in a slot 30 of the plunger 15 to limit its travel and keep it from turning. I provide the casing 17 with a chamber 31 which opens into the bore 18, and in the chamber 31 is located a spring-actuated latch 32 for locking the plunger 15 in its extended position. The latch 32 is rocked on its pivot 33 by the spring 34, which is held in position by the pins 35. The spring 34 throws the nose 36 of the latch 32 behind the plunger 15 when it passes forward and also throws the nose or projection 37 into the opening 38 of the plunger 15 to be operated against by the collar 25 for unlatching the plunger 15.

By referring to Figs. 1, and 2 it will be seen that I secure two of the casings 17 containing the locking plungers to opposite sides of the wagon by reversing their positions, and in the center or other suitable position I secure a casing 39 in the form of a T and having located therein a pair of rollers 40 for guiding the cables 13. The ends 41 of the casing 39 are of the same diameter as the ends 42 of the casing 17, which fit a standard size pipe 43. The end 44 of the casing is threaded for the reception of the end of a standard pipe 45, which has its other end secured in the frame of the wagon. These pipes 43 and 45, together with the casing 39 and the shield 46 secured to the wagon, are for preventing any one interfering with the operating cables.

Referring to Figs. 6 to 9, it will be seen that I provide a suitable casing 7 formed of two parts consisting of a main part 47' and a secondary part 48 forming a front and bottom plate and provided with a hollow extension 49 in which a standard "Yale" lock 50 is secured in a simple manner by inserting the lock into the cylindrical opening, as shown in Fig. 7, and placing in position the two plates 51, whose inner edges conform with the contour of the lock so as to form an abutment for the screws 52 of the lock. The screws 52 pressing against the plates 51 cause the outer flange of the lock to be drawn tightly against its bearing and thus hold the lock secure. The main portion 47' of the casing is provided with a partition wall 53 having a bearing 54 for the trunnion 55 of the double cam 56 which operates to open the swinging yokes 57 and 58, which are swung on the screws 59 and 60 and held in their closed position by the spring 61. The plunger 5 passes through the top and bottom of the casing and has a bearing in the top and is provided with a collar 62 which closes the opening 63 in the bottom of the casing when the plunger is locked and prevents any one tampering with the yokes to unlock the plunger. The cam 56 is provided with a rectangular opening 64 for the usual operating link 65 of the lock. The two parts of the casing 7 may be secured together by screws or any other suitable manner.

In order to alleviate the strain on the springs 22 of the plungers 15, I provide a spring 66 for supporting the weight of the seat 9.

The operation of this locking device is extremely simple. It will be seen that the weight of the driver resting upon the seat keeps all the parts in their normal position and as soon as he rises to leave the wagon, or pull in the horses in case of a run-away, the spring 66 lifts the seat and acts in conjunction with the springs 22 of the locking plungers 15. The springs 22 force the rods 14 forward by pressure against the collars 23, which contact with the plungers 15 and push them forward between the spokes of the wheels, thus preventing them from revolving. It will be noted that the plungers 15 are provided with buffing springs 26, so that in case the plungers strike the spokes as shown in Fig. 4 the springs 26 relieve the pressure of the springs 22 until the wheels revolve far enough to allow the plungers to pass between the spokes and assume the position shown in Fig. 5, which allows the latch 32 to lock the plungers in their outer position and thus prevent a thief from pushing them back and improvising means for holding them back to allow the theft of the vehicle. The forward or outward movement of the rods 14 draws the cables 12 and 13 in the direction of the arrows 67, 68 and 69, and in so doing rocks the shaft 1, which forces the plunger 5 upward and the conical locking member 6 forces the yokes 57 and 58 apart and passes beyond their locking faces 70 and the spring 61 snaps them together, thus locking all parts in position against movement.

It will be seen that by use of the flexible cables if both plungers should strike spokes the spring 66 forcing the seat up, the link 8 will carry the plunger 5 up and cause it to become locked, and as soon as the vehicle starts the plungers 15 will spring out between the spokes of the wheel. Also it is known that the spokes of a vehicle seldom register with each other, and on account of this it is desirable to have the plungers 15 act independently of each other, and this is accomplished by the construction shown in combination with the flexible cables 13. Thus it will be seen that the three independent locking devices are capable of independent locking operations.

When it is desired to release the vehicle for travel, all that is necessary is to insert the key into the lock and turn the tumbler a quarter of a turn and the cam 56 will throw open the yokes 57 and 58 and release the locking member 6, and the weight of the driver forces the seat 9 down and the link 8 draws down the plunger 5 and rocks the shaft 1 through its connections and causes the cables to be drawn in the opposite direction to that indicated by the arrows 67, 68 and 69, thus drawing back the rods 14, which on the commencement of their movement do not retract the plungers on account of the latches 32; but it will be noted that this forward movement causes the collars 25 to move forward in the plungers 15 and come in contact with the nose 37 of the latch 32 and force it from behind the plunger 15, and the collar 25 coming in contact with the bushing 24 carries the plunger back to its normal position with the rod 14.

In order to make the device applicable to different styles of vehicles and have the parts move with the proper resiliency, the springs 22 may have their power increased or diminished as desired, by either screwing the plugs 20 in or out in the casing 17.

Having fully described my invention, it will be seen that I have fully accomplished the foregoing results and that the device is entirely automatic and as soon as the driver rises from the seat the vehicle is locked, thus insuring safety and is not dependent on the driver's memory.

I claim as my invention:

1. In combination with a vehicle, an automatic locking device having independent self-acting plungers for locking the wheels against turning, means connected to the driver's seat for withdrawing the plungers, means for locking the driver's seat in the raised position and the plungers from being withdrawn, and means for independently locking the plungers in their outer position.

2. In combination with a vehicle, an automatic locking device having independent self-acting plungers for locking the wheels against turning, means connected to the driver's seat for withdrawing the plungers, means for locking the driver's seat in the raised position and the plungers from being withdrawn, means for independently locking the plungers in their outer position, and means for allowing one part of the locking mechanism to fully operate and lock when one or more of the other parts are prevented from fully operating.

3. In combination with a vehicle, an automatic locking device having independent self-acting plungers for locking the wheels against turning, means connected to the driver's seat for withdrawing the plungers, means for locking the driver's seat in the raised position and the plungers from being withdrawn, means for independently locking the plungers in their outer position, means for allowing one part of the locking mechanism to fully operate and lock when one or more of the other parts are prevented from fully operating, and means for unlocking the plungers and returning them to their normal position.

4. In combination with a vehicle, a pair of spring-actuated plungers connected to a rock shaft by cable, the said rock shaft connected to the spring-actuated driver's seat and caused to be rocked by the said seat and said operation of the rock shaft in one direction allowing the plungers to pass between the spokes of the wheels and the rocking of the shaft in the opposite direction causing the plungers to be withdrawn from between the spokes, and spring-actuated latches within the casing of the plungers for locking the plungers in their outer position and said latches can be unlocked only by the operating rods of the plungers.

5. In combination with a vehicle, a pair of spring-actuated plungers connected to a rock shaft by cable, the said rock shaft connected to the spring-actuated driver's seat and caused to be rocked by the said seat and said operation of the rock shaft in one direction allowing the plungers to pass between the spokes of the wheels and the rocking of the shaft in the opposite direction causing the plungers to be withdrawn from between the spokes, and a spring-actuated mechanism for locking the said seat in a position for preventing the plungers from being withdrawn, and spring-actuated latches within the casing of the plungers for locking the plungers in their outer position and said latches can be unlocked only by the operating rods of the plungers.

6. In combination with a vehicle, a pair of spring-actuated plungers connected to a rock shaft by cable, the said rock shaft connected to the spring-actuated driver's seat and caused to be rocked by the said seat and said operation of the rock shaft in one direction allowing the plungers to pass between the spokes of the wheels and the rocking of the shaft in the opposite direction causing the plungers to be withdrawn from between the spokes, a spring-actuated mechanism for locking the said seat in a position for preventing the plungers from being withdrawn and said spring-actuated mechanism being under the control of a standard lock and key, and spring-actuated latches within the casing of the plungers for locking the plungers in their outer position and said latches can be unlocked only by the operating rods of the plungers.

7. In combination with a vehicle, a pair of independent hollow plungers, a pair of operating rods, one for each plunger, a pair of actuating springs for operating the plungers through the said rods, a spring within each of said plungers of less resistance than the actuating spring for the purpose described, a pair of casings, one for each plunger, the said operating rods connected to a rock shaft by cable, the said rock shaft connected to the spring-actuated driver's seat and caused to be rocked by the said seat and said operation of the rock shaft in one direction allowing the plungers to pass between the spokes of the wheels and the rocking of the shaft in the opposite direction causing the plungers to be withdrawn from between the spokes, and a spring-actuated mechanism for locking the said seat in a position for preventing the plungers from being withdrawn, and spring-actuated latches within each of the casings of the hollow plungers for locking the plungers in their outer position and said latches can be unlocked only by the operating rods of the plungers.

8. In combination with a vehicle, a pair of independent hollow plungers, a pair of operating rods, one for each plunger, a pair of actuating springs for operating the plungers through the said rods, a spring within each of said plungers of less resistance than the actuating spring for the purpose described, a pair of casings, one for each plunger, a plug in each casing for increasing or decreasing the power of the said actuating spring, the said operating rods connected to a rock shaft by cable, the said rock shaft connected to the spring-actuated driver's seat and caused to be rocked by the said seat and said operation of the rock shaft in one direction allowing the plungers to pass between the spokes of the wheels and the rocking of the shaft in the opposite direction causing the plungers to be withdrawn from between the spokes, a spring-actuated mechanism for locking the said seat in a position for preventing the plungers from being withdrawn, and spring-actuated latches within each of the casings of the hollow plungers for locking the plungers in their outer position and said latches can be unlocked only by the operating rods of the plungers.

Signed at New York, in the county of New York and State of New York, this 4th day of September, A. D. 1915.

PETER DAMM.

Witnesses:
BERT RIVKIN,
LEOPOLD TROPP.

Copies of this patent may be obtained for five cents each, by addressing the "Commissioner of Patents, Washington, D. C."